(12) United States Patent
Allpress et al.

(10) Patent No.: US 8,588,323 B2
(45) Date of Patent: Nov. 19, 2013

(54) FEEDBACK IN A WIRELESS COMMUNICATION SYSTEM

(75) Inventors: Steve Allpress, Bristol (GB); Carlo Luschi, Oxfordshire (GB); Tarik Tabet, Bristol (GB)

(73) Assignee: Icera, Inc., Wilmington, DE (US)

( * ) Notice: Subject to any disclaimer, the term of this patent is extended or adjusted under 35 U.S.C. 154(b) by 246 days.

(21) Appl. No.: 13/057,780

(22) PCT Filed: Apr. 15, 2009

(86) PCT No.: PCT/EP2009/054460
§ 371 (c)(1),
(2), (4) Date: Feb. 7, 2011

(87) PCT Pub. No.: WO2010/015429
PCT Pub. Date: Feb. 11, 2010

(65) Prior Publication Data
US 2011/0142144 A1    Jun. 16, 2011

(30) Foreign Application Priority Data

Aug. 7, 2008 (GB) .................................. 0814495.8

(51) Int. Cl.
*H04B 7/02* (2006.01)
*H04L 1/02* (2006.01)

(52) U.S. Cl.
USPC .......................................... 375/267; 375/260

(58) Field of Classification Search
USPC ......................................................... 375/267
See application file for complete search history.

(56) References Cited

U.S. PATENT DOCUMENTS

| 2006/0165188 | A1 | 7/2006 | Wunder et al. | |
|---|---|---|---|---|
| 2009/0017769 | A1* | 1/2009 | Chen et al. | 455/69 |
| 2011/0268204 | A1* | 11/2011 | Choi et al. | 375/260 |
| 2012/0008613 | A1* | 1/2012 | Lee et al. | 370/338 |

FOREIGN PATENT DOCUMENTS

| CN | 1812353 A | 8/2006 |
|---|---|---|
| GB | 0814495.8 | 10/2009 |
| WO | 2007105928 A1 | 9/2007 |
| WO | 2008/051038 A1 | 5/2008 |
| WO | 2008/154201 A2 | 12/2008 |
| WO | 2008/156319 A2 | 12/2008 |
| WO | 2009/059039 | 5/2009 |
| WO | PCT/EP2009/054460 | 10/2009 |

OTHER PUBLICATIONS

LG Electronics, "On the Implementation of Rank Override Using Codeword DTX," 3rd Generation Partnership Project (3GPP) Draft, R1-074200, Oct. 2007, 3 pages, vol. RAN WG1 #50 bis, Shanghai, China.

(Continued)

*Primary Examiner* — Erin File

(57) ABSTRACT

The invention relates to a method of feeding back information from a receiver to a transmitter, and also a corresponding receiver, transmitter, system comprising a receiver and transmitter, and computer program products for performing the steps of the receiver and transmitter respectively. The method comprises: receiving signals at the receiver from the transmitter over a wireless multiple-input-multiple-output channel; and, based on the received signals, transmitting back reports from the receiver to the transmitter including a report indicating a pre-coding matrix and a report indicating a rank of the pre-coding matrix. In the event that the report indicating the rank is not transmitted, the receiver instead uses a default rank to determine the report.

55 Claims, 5 Drawing Sheets

(56) References Cited

OTHER PUBLICATIONS

Sharp, "Impact of the PMI/RI Report Drop on the PUCCH CQI Report," 3rd Generation Partnership Project (3GPP) Draft, R1-082273, Jun. 2008, 4 pages, vol. RAN WG1 Meeting #53 bis, Warsaw, Poland.

Icera Semiconductor, "Dropping of RI/PMI Report on PUCCH," 3rd Generation Partnership Project (3GPP) Draft, R1-083201, Aug. 2008, 3 pages, vol. RAN WG1 Meeting #54, Jeju, Korea.

"Technical Specification Group Radio Access Network: Evolved Universal Terrestrial Radio Access (E-UTRA); Physical Layer Procedures (Release 8)", 3GPP TS 36.213, V8.3.0, May 2008.

D. Love et al., "Limited Feedback Precoding for Spatial Multiplexing Systems", in Proc. IEEE Globecom 2003, pp. 1857-1861.

"Dropping of RI/PMI Report on PUCCH,"icera Semiconductor, 3GPP TSG WG1 Meeting #54, Document R1-083201, Jeju, Korea, Aug. 18-22, 2008, 4 pages.

Foreign Communication from a Related Counterpart Application, Chinese Application 2009801396520, Chinese Office Action dated Apr. 3, 2013, 11 pages.

Foreign Communication from a Related Counterpart Application, Chinese Application 2009801396520, Partial Translation of Chinese Office Action dated Apr. 3, 2013, 4 pages.

Foreign Communication from a Related Counterpart Application, Chinese Application 2009801396520, English Translation of Chinese Search Report dated Mar. 26, 2013, 2 pages.

* cited by examiner

FEEDBACK IN A WIRELESS COMMUNICATION SYSTEM

FIELD OF THE INVENTION

The present invention relates to the feedback of channel related information in a Multiple-Input Multiple-Output (MIMO) system.

BACKGROUND

In a wireless communication system implementing link adaptation, a receiver such as a mobile terminal feeds back channel information to a transmitter such as a base station so that the transmitter can adapt its transmission to the receiver in dependence on channel conditions.

MIMO refers to the use of multiple transmit antennas and multiple receive antennas for the transmission of a signal in order to improve performance in a wireless communication system. A highly schematised block diagram of a MIMO system is shown in FIG. 1. The system comprises a transmitter 2 having multiple antennas 6(1) ... 6(n) and a receiver 4 having multiple antennas 8(1) ... 8(m). For example, in a cellular communication system like the 3GPP Long Term Evolution (LTE) standard, the transmitter 2 may be a base station (e.g. eNode-B in the 3GPP terminology) and the receiver 4 may be a mobile terminal (user equipment or UE in the 3GPP terminology). The transmitter 2 transmits a signal on some or all of its antennas 6, and the receiver 4 receives the signal on some or all of its antennas 8. To achieve good closed-loop performance, the transmitter 2 may perform MIMO "pre-coding" whereby it uses channel information to determine the relative amplitude and phase with which to transmit the signal on each antenna.

In general, this information has to be fed back from the receiver 4. To reduce the amount of feedback overhead, a precoding matrix approach was proposed in D. Love and R. W. Heath, "Limited Feedback Precoding for Spatial Multiplexing Systems", in Proc. IEEE Globecom 2003, pp. 1857-1861. The basic idea behind this approach is to quantize the MIMO channel using a codebook consisting of a set of pre-defined matrices. For each channel realization, the receiver 4 finds the best precoding matrix (according to some performance criteria) from the codebook shared between the receiver and the transmitter, and then feeds back only the index of this matrix to the transmitter. This index may be referred to as a precoding matrix indicator (PMI).

Another piece of information that the receiver 4 feeds back to the transmitter 2 is the rank indicator (RI). This provides the rank of the channel matrix, which is defined as the number of linearly independent columns of the channel matrix. For example, a $N_T=4 \times N_R=4$ channel matrix can have rank equal to 4, 3, 2 or 1 (rank≤min $(N_T,N_R)$). The rank of the channel also determines the size of the precoding matrix to be used by the transmitter, i.e., the number of columns of the precoding matrix. Depending on the channel rank, the transmitter 2 will consider a specific subset of the full precoding codebook. Therefore, the transmitter 2 needs to know what rank the received PMI is referring to.

Further, in addition to the RI and PMI, the receiver 4 feeds back a channel quality indicator (CQI) to the transmitter 2, indicative of some metric relating to the received quality on the downlink channel. The transmitter 2 can then also take this into account when adjusting its transmission to the receiver 2, typically selecting the appropriate modulation scheme and code rate to match the receiver channel quality information.

As illustrated schematically in FIG. 2, the downlink channel may be an Orthogonal Frequency Division Multiplexing (OFDM) channel comprising a plurality of frequency sub-bands 12, with the sub-bands being grouped together into groups of sub-bands 14. The feedback of the CQI information may be either frequency selective or non frequency selective. In the non frequency selective case, the receiver 4 simply feeds back a single wideband CQI for the whole channel. In the frequency selective case, the receiver 4 also feeds back a CQI for each of a plurality of groups of sub-bands 14.

In the current 3GPP LTE standard, the rank indicator (RI), precoding matrix indicator (PMI) and channel quality indicator (CQI) are typically reported periodically from the UE to the eNode-B. This periodic reporting is based on a control signalling in the form of a set of parameters transmitted by the network via the eNode-B to the UE, which determine the periodicity of the different reports for a given feedback mode [3GPP TS 36.213, "Technical Specification Group Radio Access Network: Evolved Universal Terrestrial Radio Access (E-UTRA); Physical Layer Procedures (Release 8)", V8.3.0, May 2008, Section 7.2.2].

For the non-frequency selective periodic CQI modes, the UE reports in different uplink reporting instances a) RI and b) wideband CQI/PMI for the modes with PMI report or only wideband CQI for the modes with no PMI report [3GPP TS 36.213, "Technical Specification Group Radio Access Network: Evolved Universal Terrestrial Radio Access (E-UTRA); Physical Layer Procedures (Release 8)", V8.3.0, May 2008, Table 7.2.2-3].

For the frequency selective periodic CQI modes, the UE reports in different uplink reporting instances a) RI, b) wideband CQI/PMI for the modes with PMI report or only wideband CQI for the modes with no PMI report, and c) frequency selective CQI in terms of multiple sub-band CQIs [3GPP TS 36.213, "Technical Specification Group Radio Access Network: Evolved Universal Terrestrial Radio Access (E-UTRA); Physical Layer Procedures (Release 8)", V8.3.0, May 2008, Table 7.2.2-3].

The control signalling from the eNode-B to the UE may be transmitted on the Primary Downlink Control Channel (PDCCH) and the RI, PMI and CQI reports fed back from the UE to the eNode-B may be signalled on the Primary Uplink Control Channel (PUCCH). An example of the RI, PMI and CQI information sent on the PUCCH 20 is illustrated schematically in FIG. 3a. Here, the PUCCH 20 comprises the sequential transmission in time on a plurality of reporting instances 22(t), 22(t+1), 22(t+2), etc. Here, the first reporting instance comprises a report of the RI, the second reporting instance comprises a report of the wideband PMI and wideband CQI, and by way of example the next four reporting instances comprise respective reports of the sub-band CQI values for each of four groups of sub-bands 14. Following the sub-band CQI reports, the sequence of an uplink reporting instance including the wideband PMI and CQI report followed by four reporting instances including sub-band CQI reports is repeated. That sequence may be repeated a number of times periodically, and after that the whole sequence may be repeated again periodically starting with another RI report and so on. The actual RI, PMI and CQI values reported will be updated with each periodic repetition on the relevant reporting instances. Note that FIG. 3a shows an example of a frequency selective report, but it will be understood that a non-frequency selective report would contain the same sequence of RI, PMI and CQI reports, except that it would not include the sub-band CQI values.

However, in some cases the UE may for certain reasons not transmit on one or more reporting instances 22 of the PUCCH 20. If an RI, PMI and/or CQI report is scheduled for such a reporting instance 22, then this RI, PMI and/or CQI report is said to be "dropped" and it will not be transmitted. There are also certain cases where a higher priority uplink transmission may cause an RI, PMI and/or CQI report to be replaced on a certain reporting instance 22. More specifically, when the UE has any other higher priority control information to be transmitted on the PUCCH, it will need to replace any RI, PMI and/or CQI report scheduled on that reporting instance 22. In such cases, the RI, PMI and/or CQI report is again said to be "dropped" from the reporting instance 22 in question.

The 3GPP LTE standard allows the possibility of dropping the transmission of RI and wideband CQI or wideband CQI/PMI from a given reporting instance 22 for different reasons:

An aperiodic CQI report on PUSCH is requested, which will be transmitted instead of the scheduled periodic CQI report on PUCCH.

A scheduling request (SR) needs to be transmitted by the UE, which will cause a drop of information on PUCCH.

A positive or negative acknowledgment (ACK/NACK) needs to be transmitted by the UE, which will cause a drop of information on PUCCH.

A UE Discontinuous Reception (DRX) inactive cycle will cause any uplink transmissions to be invalid (typically for power saving reasons).

RI and wideband CQI/PMI collisions due to the RI offset parameter set to O=0 by the eNode-B, in which case the UE will drop the wideband CQI/PMI transmission.

In the presence of a measurement gap, the UE will drop all uplink transmissions overlapping with the gap.

The missed transmission of this information in the uplink can cause a problem, because without the RI and/or PMI transmission, the CQI values sent on the following reporting instances have no meaning. In fact, all the RI/PMI/CQI reports are linked, and the wideband PMI is computed based on the reported rank while the sub-band CQI values are determined by the UE based on both the reported rank and precoding matrix. So the meaning of the reported PMI depends on the RI, and the meaning of the reported CQI depends on the RI and PMI. This implies that the eNode-B needs to know the correct RI in order to correctly interpret the reported PMI, and needs to know the correct RI and PMI in order to correctly interpret the reported CQI The current status of the LTE specification is to do nothing and accept losing the RI or PMI information in the presence of a drop of a scheduled RI or PMI transmission.

A possible alternative solution is to configure the UE to reschedule the RI report by shifting it along in time to another reporting instance after the reporting instance at which it was originally scheduled. All subsequent reports are then also shifted along in time by the same number of reporting instances 22. This means that under normal circumstances, the eNode-B should still receive the RI correctly in order to interpret the subsequent PMI and CQI reports.

An example of this is illustrated in FIG. 3b, which shows the case of a DRX inactive cycle in which any uplink transmissions are invalid, or a measurement gap in which the uplink signal is not transmitted. Consider a scenario where a measurement gap or a UE DRX inactive cycle overlaps with a PUCCH reporting instance 22 containing an RI transmission, as depicted in the FIG. 3b (the DRX/GAP period can last multiple WB/CQI reporting intervals, but for illustration only one WB/CQI interval is shown as overlapping the DRX/GAP period). Under the current status of the LTE specification, any reports in the DRX/GAP period would simply be dropped and not retransmitted. But, under the possible alternative solution, the RI report is re-scheduled to the next available reporting instance 22(t+4) immediately after the end of the DRX/GAP period, and the subsequent sequence of PMI and CQI reports is shifted along in time accordingly.

Another example is illustrated in FIG. 3c, which shows the case where the UE receives data transmission from the eNode-B and in response must send back a positive acknowledgement signal ACK or a negative acknowledgement signal NACK to the eNode-B in the next reporting instance 22 of the PUCCH 20. That means that the RI, PMI or CQI report that was scheduled for that reporting instance must be dropped, since the ACK has higher priority than the RI, PMI and CQI reports. Again, under the current status of the LTE specification, that report would simply be omitted altogether and not retransmitted. This would include the possibility an RI report being replaced by the ACK/NACK. But, under the possible alternative solution, the RI report would be re-scheduled to the next reporting instance 22(t+1) immediately after the ACK/NACK, with the subsequent sequence of PMI and CQI reports being shifted along in time accordingly. Similar comments apply to any higher priority transmission that the UE must make to the eNode-B, which will displace an RI report.

Another alternative for the case of frequency-selective CQI report is to sacrifice one of the sub-band CQI reports every time a drop of RI or PMI transmission has occurred. Examples of this are illustrated in FIGS. 3d and 3e. In FIG. 3e for example the next sub-band CQI report CQI1 is deliberately omitted from transmission by the UE, and the eNode-B is configured to expect that CQI report CQI1 to be dropped. Similarly in FIG. 3d, the sub-band CQI report CQI3 is deliberately omitted from reporting instance 22(t+4), and the eNode-B is configured to expect that accordingly.

Yet another alternative would be to retransmit the dropped RI at the next opportunity, and to shift the subsequent sequence of PMI and CQI reports by one place, until the next wideband CQI/PMI reporting instance, thereby again sacrificing one of the sub-band CQI reports.

When an RI report is dropped, the current state of the LTE specification causes a problem because the eNode-B will lose the information of an entire reporting interval between one RI and the next.

However, the alternative solution discussed in relation to FIGS. 3b and 3c is also problematic because it can lead to a misalignment between eNode-B and UE in the interpretation of the different reports. For example, if a control signalling from the eNode-B is not properly detected by the UE, perhaps due to a poor quality PDCCH, then the UE may miss the transmission of downlink data, and not report the corresponding ACK/NACK in the uplink. In this case, there may be a discrepancy between what the UE transmits and what the eNode-B expects to receive. So referring to FIGS. 3b and 3c for example, the UE may transmit with the scheduling shown in the top row whilst the eNode-B expects to receive the scheduling shown in the bottom row. Thus the eNode-B's expectation will not be aligned with the UE's actual PUCCH transmission.

The alternative solution of FIGS. 3d and 3e reduces the impact of this misalignment problem to some extent. In FIG. 3e for example, the misalignment will always be regained again by reporting instance 22(t+3), and in FIG. 3d it will be regained by reporting instance 22(t+5). However, the situation in FIGS. 3d and 3e is still problematic in another way because it requires one of the sub-band CQI reports to be sacrificed.

It is an aim of the present invention to find an alternative solution to the problem of RI dropping.

SUMMARY

According to one aspect of the present invention, there is provided a method of feeding back information from a receiver to a transmitter, the method comprising: transmitting signals from the transmitter to the receiver over a wireless multiple-input-multiple-output channel; based on the received signals, transmitting a plurality of reports back from the receiver to the transmitter in a periodic sequence of respective time intervals, the reports of each period comprising at least an indication of a pre-coding matrix and an indication of a rank of the pre-coding matrix; in response to an event, omitting the report comprising the rank indication from one of said periods; at the receiver, determining a subsequent report comprising an indication of a pre-coding matrix on the basis of a predetermined default rank, and transmitting that report to the transmitter; and at the transmitter, interpreting the indication of the pre-coding matrix without a report of a rank indication for said period by instead using the predetermined default rank, and using that interpretation to control a transmission of a subsequent signal to the receiver over the wireless multiple-input-multiple-output channel.

By completely omitting the rank indicator report and instead using a default rank, rather than rescheduling the rank indicator report, the present invention provides improved reliability. In embodiments, it may also allow the possibility of using full frequency selective CQI information.

According to another aspect of the present invention, there is provided a method of feeding back information from a receiver to a transmitter, the method comprising: receiving signals at the receiver from the transmitter over a wireless multiple-input-multiple-output channel; based on the received signals, sequentially transmitting a plurality of reporting instances back from the receiver to the transmitter including at least a report indicating a pre-coding matrix; in the event that a report indicating a rank of the respective pre-coding matrix is not transmitted back from the receiver to the transmitter before transmitting the report indicating a pre-coding matrix, then instead, at the receiver, determining the report indicating the pre-coding matrix using a default rank, and transmitting that report back to the transmitter.

According to another aspect of the present invention, there is provided a method of feeding back information from a receiver to a transmitter, the method comprising: receiving signals at the receiver from the transmitter over a wireless multiple-input-multiple-output channel; based on the received signals, transmitting a plurality of reports back from the receiver to the transmitter in a periodic sequence, each period comprising a plurality of reports at respective time intervals, the reports of each period including an RI report and a PMI report, but at least an RI report in one of said periods being replaced with one of an ACK, NACK and SR or missed due to a DRX cycle; at the receiver, determining a PMI report of said period on the basis of a default rank, and transmitting that report back to the transmitter.

According to further aspects of the invention, there are provided corresponding receivers, transmitters, and communication systems comprising transmitter and receiver. For each of the receiver and transmitter, there is also provided a corresponding computer program product comprising code which when executed on a processor of the receiver or transmitter respectively operates it to perform the method steps of the receiver or transmitter respectively.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

According to a preferred embodiment of the present invention, a default RI value is assumed in case the RI report is dropped. Both the base station (eNode-B) and the mobile terminal (UE) assume a default RI value, preferably RI=1, in the case where the RI report on PUCCH is dropped. Thus, instead of rescheduling the RI report or omitting a sub-band CQI report as discussed in relation to FIGS. 3b-3e, the RI report itself is omitted and a default value used.

Figure 1:
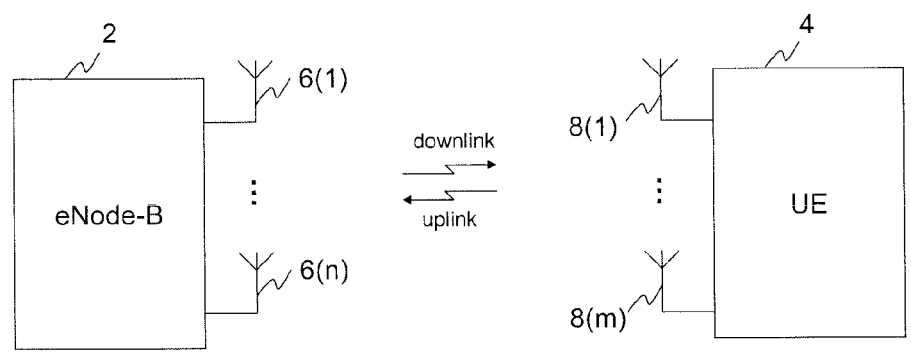
FIG. 1 is a schematic block diagram of a wireless communication system.
Figure 2:
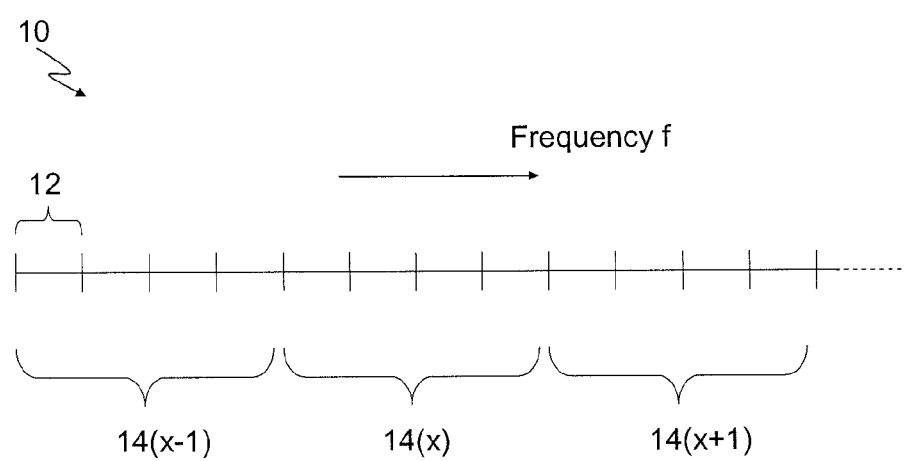
FIG. 2 is a schematic representation of an OFDM channel.
Figure 3A:
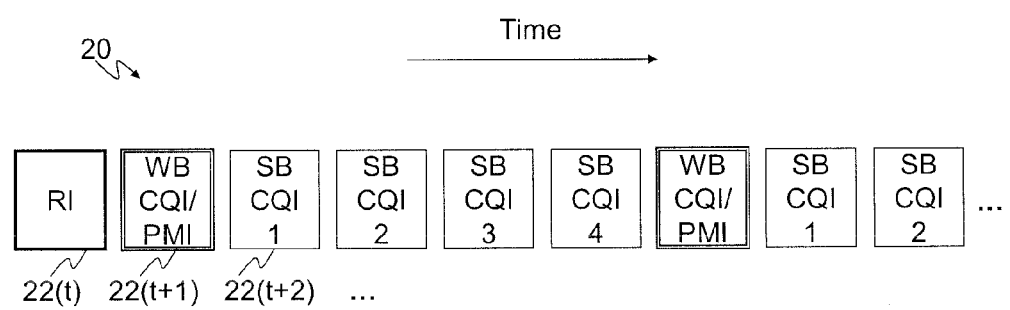
FIG. 3a is a schematic representation of feedback from a UE on a PUCCH.
Figure 3B:
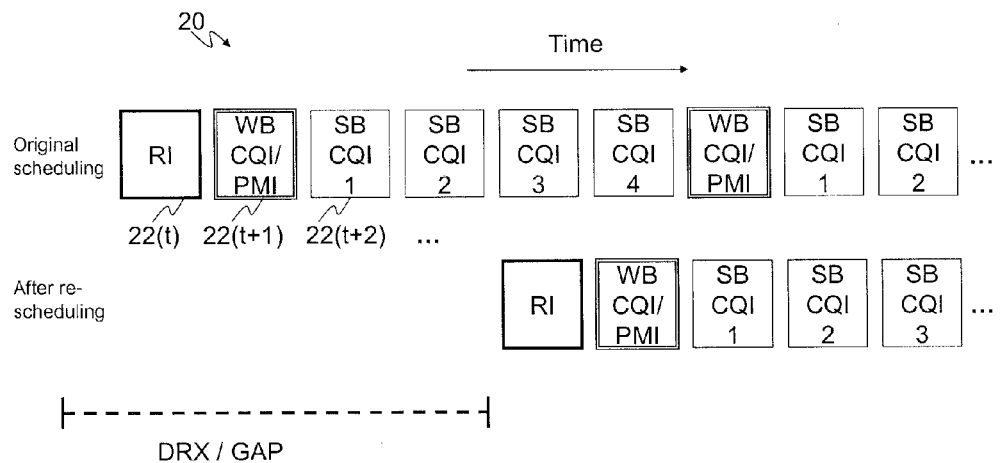
FIG. 3b is another schematic representation of feedback on a PUCCH.
Figure 3C:
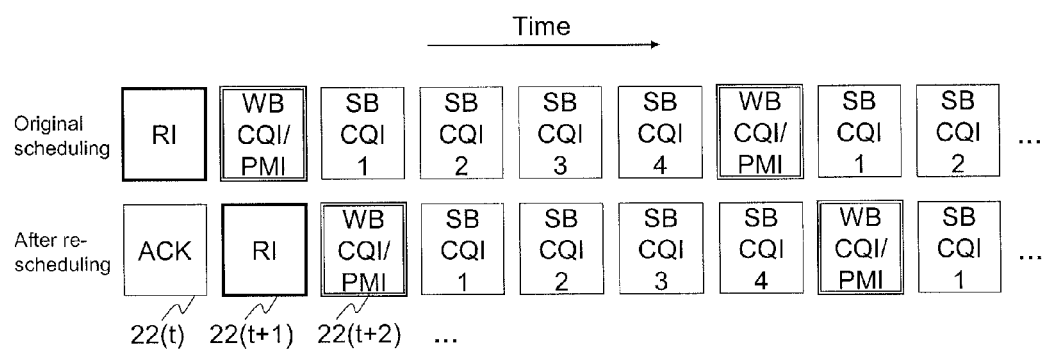
FIG. 3c is another schematic representation of feedback on a PUCCH.
Figure 3D:
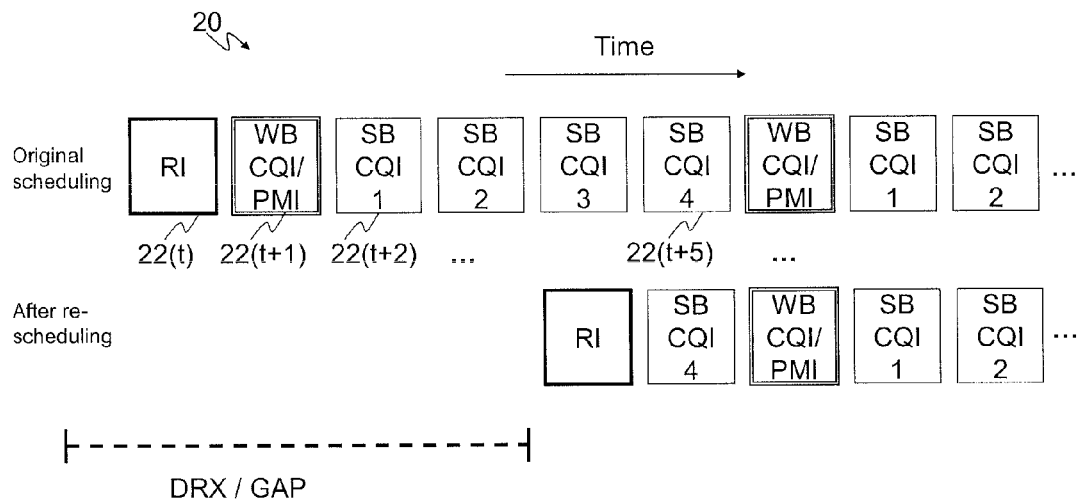
FIG. 3d is another schematic representation of feedback on a PUCCH.
Figure 3E:
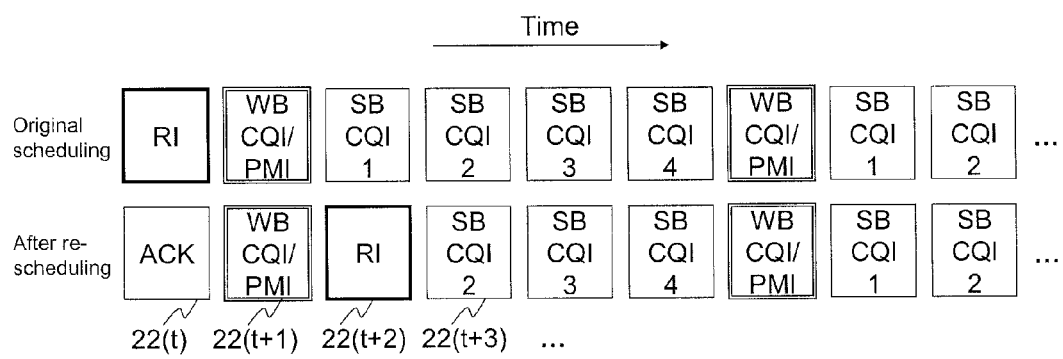
FIG. 3e is another schematic representation of feedback on a PUCCH.
Figure 3F:
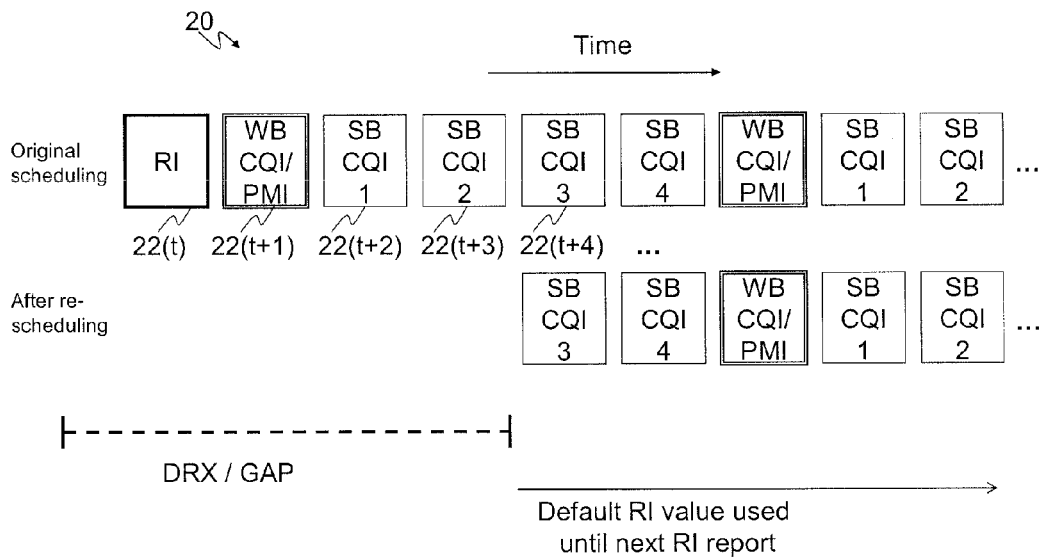
FIG. 3f is another schematic representation of feedback on a PUCCH.
Figure 3G:
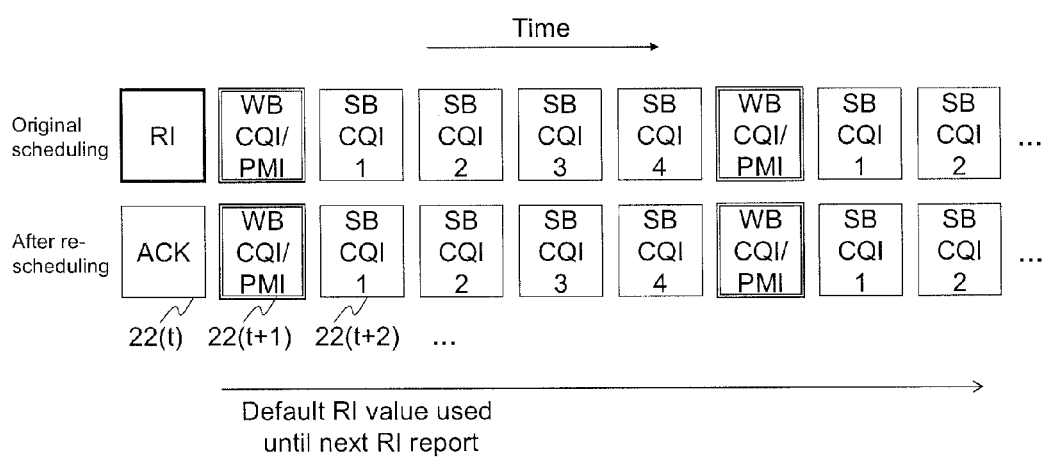
FIG. 3g is another schematic representation of feedback on a PUCCH.

This is illustrated schematically in FIGS. 3f and 3g. In FIG. 3f, a DRX inactive cycle or measurement gap lasts until reporting instance $22(t+3)$, causing the RI report to be dropped. However, the RI report is not rescheduled and does not displace any other report. Instead, the reports simply continue as previously scheduled from reporting instance $22(t+4)$ onwards. However, the UE computes those reports on the basis of a default RI value, preferably RI=1. The eNode-B is aware of the mechanism that has led to the drop of the RI transmission, and hence knows that it should use the default RI value to interpret subsequent MI and/or CQI reports, instead of relying on an actual RI report. That is to say, the eNode-B is pre-configured with the default-value. (Although note, in the case of FIG. 3f, the eNode-B will not be able to use the sub-band CQI reports at reporting instances $22(t+4)$ and $22(t+5)$, unless it is agreed to retransmit earlier the wideband CQI/PMI report.)

Similarly, in FIG. 3g, a data transmission from the eNode-B requires the UE to transmit a response such as an ACK in the reporting instance $22(t)$ in place of the RI report, causing the RI report to be dropped. Again, the RI report is not rescheduled and does not displace any other report. Instead, the reports simply continue as previously scheduled from reporting instance $22(t+1)$ onwards.

Another RI dropping scenario would occur if any higher priority control information (aperiodic CQI report, SR, ACK/NACK or other) needs to be transmitted on the uplink PUCCH in place of a scheduled RI report, in which case that scheduled RI transmission is dropped for that reporting instance in favour of the required higher priority transmission. In this case, instead of the RI report, both the UE and eNode-B are again configured to use a default RI value, preferably RI=1. That is, the UE determines subsequent PMI and CQI reports relative to the default RI value, and in complement the eNode-B interprets the subsequent PMI and CQI reports using the default RI value. In this sense, both the UE and eNode-B "assume" a default RI value.

Another scenario would be that the RI parameter offset O, signalled by higher layers and denoting the interval between RI and WB CQI/PMI reports happens to be zero. This leads to a collision between the RI and WB CQI/PMI reports. In that case, as stated by the 3GPP specifications, the WB CQI/PMI is dropped, and the RI is still transmitted. Under these circumstances, in the case of frequency selective CQI, the SB CQI become useless since they cannot be correctly interpreted by the eNodeB. In contrast, the preferred solution will keep the transmission of the WB CQI/PMI in place by using a default rank value (RI=1). All the following WB CQI/PMI and SB CQI will be computed and transmitted based on the default rank value In addition, in a preferred scheme the UE may retransmit the wideband CQI and PMI report when the wideband CQI/PMI transmission is dropped. That is, if a DRX inactive cycle or measurement gap overlaps with a scheduled wideband PMI and CQI report, or if any other higher priority control information needs to be transmitted on the uplink PUCCH in place of a scheduled wideband PMI and CQI report, then that scheduled wideband PMI/CQI transmission is dropped for that reporting instance and may be transmitted on a subsequent reporting instance, preferably the next reporting instance. This may involve a subsequent sub-band CQI report being omitted, analogously to the omission in FIGS. 3d and 3e.

The preferred scheme is summarised as follows.
In the case where the RI transmission on PUCCH is dropped, both UE and base station (eNode-B) assume a default RI value RI=1.
In the case where the wideband CQI or the wideband CQI/PMI transmission on PUCCH is dropped, then:
 a) for non-frequency selective CQI report modes, do nothing (since the wideband CQI or wideband CQI/PMI will anyway be transmitted at the next reporting instance);
 b) for frequency selective CQI report modes, do nothing and wait for the next wideband CQI/PMI reporting instance, or retransmit the wideband CQI or the wideband CQI/PMI in place of a single sub-band CQI report, and then go back to the normal reporting instants.

The above solution guarantees a default mode of operation that is agreed between the UE and the e-Node-B. With the approach based on a default rank mode, both the UE and the e-Node-B can safely rely on a fallback transmission mode in case of drop of information. This is in contrast to the techniques of the prior art, where RI retransmission forces the eNode-B to use only part of the frequency selective CQI report, which implies reduced information for frequency selective scheduling in the current CQI/PMI reporting cycle.

In addition, the proposed solution has the advantage of simplicity and the advantage of not requiring a specific additional operation mode necessary for the retransmission of dropped RI and/or PMI as proposed in the prior art.

The above solution is general, and does not depend on the kind of event causing the UE to drop an RI/PMI/CQI transmission. The solution provides improved reliability (preferred default mode is based on rank 1), and the possibility of using full frequency selective CQI information.

It will be appreciated that the above embodiments have been described only by way of example. For instance, although the above has been described in terms of a UE and eNode-B, the present invention can apply to any kind of mobile terminal and base station, or most generally any system of wireless transmitter and receiver in which the receiver feeds back information to the transmitter. Further, although the above has a preferred application to 3GPP LTE standards, it may have an application to other wireless communications systems: the terms pre-coding matrix indicator or PMI, rank indicator or RI, and channel quality indicator or CQI, or similar, are not intended to refer to their specific definitions under any one particular standard. In general, pre-coding matrix can refer to any matrix determining the amplitudes and phases with which to transmit a signal on the antennas of a communication system having multiple transmit and receive antennas, and rank can refer to the rank of any channel matrix. Similarly, channel quality indicator can in general refer to any metric relating to the received quality on the downlink channel, whose interpretation when fed back to the transmitter is dependent on the rank and/or pre-coding matrix. Furthermore, where the above refers to reporting instances, it will be understood that this may refer to time intervals of one or more uplink sub-frames or any other time transmission instances of any uplink channel. Other applications and configurations may also be apparent to the person skilled in the art given the disclosure herein. The scope of the invention is not limited by the described embodiments.

The invention claimed is:

1. A method of feeding back information from a receiver to a transmitter, the method comprising:
    transmitting signals from the transmitter to the receiver over a wireless multiple-input-multiple-output channel;
    based on the received signals, transmitting a plurality of reports back from the receiver to the transmitter in a periodic sequence of respective time intervals, the reports of each period comprising at least an indication of a pre-coding matrix and an indication of a rank of the pre-coding matrix;
    in response to an event, omitting the report comprising the rank indication from one of said periods;
    at the receiver, determining a subsequent report comprising an indication of a pre-coding matrix on the basis of a predetermined default rank, and transmitting that report to the transmitter; and
    at the transmitter, interpreting the indication of the pre-coding matrix without a report of a rank indication for said period by instead using the predetermined default rank, and using that interpretation to control a transmission of a subsequent signal to the receiver over the wireless multiple-input-multiple-output channel.

2. The method of claim 1, wherein said event comprises transmission of one of an ACK, a NACK and a Scheduling Request (SR) from the receiver to the transmitter, and the method comprises replacing the omitted report comprising the rank indication in said period with the one of the ACK, NACK and SR.

3. The method of claim 1, wherein said event comprises a Discontinuous Reception (DRX) cycle.

4. The method of claim 1, wherein the reports of each period further comprise a channel quality indicator of said channel, and the method further comprises:
    at the receiver, determining a subsequent report comprising an indication of a channel quality indicator on the basis of said predetermined default rank, and transmitting that report to the transmitter; and
    at the transmitter, interpreting the indication of the channel quality indicator without a report of a rank indication for said period by instead using the predetermined default rank, and using that interpretation to control a transmission of a subsequent signal to the receiver over the wireless multiple-input-multiple-output channel.

5. The method of claim 1, comprising dropping a report comprising an indication of a pre-coding matrix from its time interval in a period.

6. The method of claim 1, wherein the reports of each period further comprise a channel quality indicator of said channel, and the method comprises dropping a report comprising a channel quality indicator from its time interval in a period.

7. The method of claim 5, comprising: displacing the dropped report comprising an indication of a pre-coding matrix to a subsequent time interval of the period.

8. The method of claim 6, wherein the method comprises displacing the dropped report comprising a channel quality indicator to a subsequent time interval of the period.

9. The method of claim 5, comprising omitting the dropped report of a pre-coding matrix.

10. The method of claim 6, comprising omitting the dropped report of a channel quality indicator.

11. The method of claim 1, wherein the default rank is equal to one.

12. The method of claim 1, wherein at least one of said indications of a pre-coding matrix and channel quality indicators is a wideband value relevant to substantially all available frequencies of said channel.

13. The method of claim 4, wherein said channel comprises a plurality of frequency intervals, and at least some of said channel quality indicators are frequency-selective channel quality indicators each relevant to a respective one of said frequency intervals.

14. The method of claim 1, wherein said event comprises receipt of a control signal at the receiver from the transmitter.

15. The method of claim 14, comprising transmitting control information in response to the control signal in the time interval in place of the report comprising the omitted rank indication.

16. The method of claim 1, wherein said event comprises receipt of data at the receiver from the transmitter.

17. The method of claim 16, comprising transmitting a data acknowledgement signal in the time interval in place of the report comprising the omitted rank indication.

18. A communication system comprising:
a receiver; and
a transmitter for transmitting signals to the receiver over a wireless multiple-input-multiple-output channel;
wherein the receiver comprises feedback means configured to, based on the received signals, transmit a plurality of reports back to the transmitter in a periodic sequence of respective time intervals, the reports of each period comprising at least an indication of a pre-coding matrix and an indication of a rank of the pre-coding matrix; the receiver comprises processing means configured to, in response to an event, omit the report comprising the rank indication from one of said periods; the receiver's processing means are further configured to determine a subsequent report comprising an indication of a pre-coding matrix on the basis of a predetermined default rank, and transmit that report to the transmitter; and the transmitter comprises processing means configured to interpret the indication of the pre-coding matrix without a report of a rank indication for said period by instead using the predetermined default rank, and using that interpretation to control a transmission of a subsequent signal to the receiver over the wireless multiple-input-multiple-output channel.

19. The system of claim 18, wherein said event comprises transmission of one of an ACK, a NACK and a Scheduling Request (SR) from the receiver to the transmitter, and the processing means is configured to replace the omitted report comprising the rank indication in said period with the one of the ACK, NACK and SR.

20. The system of claim 18, wherein said event comprises a Discontinuous Reception (DRX) cycle.

21. The system of claim 18, wherein the reports of each period further comprise a channel quality indicator of said channel, and: the receiver's processing means are further configured to determine a subsequent report comprising an indication of a channel quality indicator on the basis of said predetermined default rank, and transmit that report to the transmitter; and the transmitter's processing means are configured to interpret the indication of the channel quality indicator without a report of a rank indication for said period by instead using the predetermined default rank, and using that interpretation to control a transmission of a subsequent signal to the receiver over the wireless multiple-input-multiple-output channel.

22. A receiver for receiving signals from a transmitter over a wireless multiple-input-multiple-output channel, the receiver comprising:
feedback means configured to, based on the received signals, transmit a plurality of reports back to the transmitter in a periodic sequence of respective time intervals, the reports of each period comprising at least an indication of a pre-coding matrix and an indication of a rank of the pre-coding matrix;
the receiver comprises processing means configured to, in response to an event, omit the report comprising the rank indication from one of said periods;
the processing means are further configured to determine a subsequent report comprising an indication of a pre-coding matrix on the basis of a predetermined default rank, and transmit that report to the transmitter.

23. The receiver of claim 22, wherein said event comprises transmission of one of an ACK, a NACK and a Scheduling Request (SR) from the receiver to the transmitter, and the processing means is configured to replace the omitted report comprising the rank indication in said period with the one of the ACK, NACK and SR.

24. The receiver of claim 22, wherein said event comprises a Discontinuous Reception (DRX) cycle.

25. The receiver of claim 22, wherein the reports of each period further comprise a channel quality indicator of said channel, and the receiver's processing means are further configured to determine a subsequent report comprising an indication of a channel quality indicator on the basis of said predetermined default rank, and transmit that report to the transmitter.

26. A transmitter for transmitting signals to a receiver over a wireless multiple-input-multiple-output channel and receiving a plurality of reports back from the receiver in a periodic sequence of respective time intervals, the reports of each period comprising at least an indication of a pre-coding matrix and an indication of a rank of the pre-coding matrix but with one of said periods omitting the rank indication, the transmitter comprising:
processing means configured to interpret an indication of a pre-coding matrix received back from the receiver without a report of a rank indication for the one of said periods by instead using a predetermined default rank, wherein the transmitter is pre-configured with the predetermined default rank and use that interpretation to control a transmission of a subsquent signal to the receiver over the wireless multiple-input-multiple-output channel.

27. The transmitter of claim 26, wherein the reports of each period further comprise a channel quality indicator of said channel, and: the transmitter's processing means are configured to interpret the indication of the channel quality indicator without a report of a rank indication for said period by instead using the predetermined default rank, and using that interpretation to control a transmission of a subsequent signal to the receiver over the wireless multiple-input-multiple-output channel.

28. A computer program product for feeding back information from a receiver to a transmitter, the program comprising code stored on a non-transitory computer readable medium, which when executed on a processor of the receiver:
receives signals from the transmitter over a wireless multiple-input-multiple-output channel;
based on the received signals, transmits a plurality of reports back from the receiver to the transmitter in a periodic sequence of respective time intervals, the reports of each period comprising at least an indication of a pre-coding matrix and an indication of a rank of the pre-coding matrix;
in response to an event, omits the report comprising the rank indication from one of said periods;
determines a subsequent report comprising an indication of a pre-coding matrix on the basis of a predetermined default rank, and transmits that report to the transmitter.

29. The computer program product of claim 28, wherein said event comprises transmission of one of an ACK, a NACK and a Scheduling Request (SR) from the receiver to the transmitter, and when executed the code will replace the omitted report comprising the rank indication in said period with the one of the ACK, NACK and SR.

30. The computer program product of claim 29, wherein said event comprises a Discontinuous Reception (DRX) cycle.

31. The computer program product of claim 28, 29 or 30, wherein the reports of each period further comprise a channel quality indicator of said channel, and: when executed the code will determine a subsequent report comprising an indication of a channel quality indicator on the basis of said predetermined default rank, and transmit that report to the transmitter.

32. A computer program product for transmitting signals to the receiver over a wireless multiple-input-multiple-output channel and receiving a plurality of reports back from the receiver in a periodic sequence of respective time intervals, the reports of each period comprising at least an indication of a pre-coding matrix and an indication of a rank of the pre-coding matrix but with one of said periods omitting the rank indication, the program comprising code stored on a non-transitory computer readable medium, which when executed on a processor of the transmitter:
interprets the indication of the pre-coding matrix without a report of a rank indication for the one of said periods by instead using a predetermined default rank, wherein the transmitter is pre-configured with the predetermined default rank and use that interpretation to control a transmission of a subsequent signal to the receiver over the wireless multiple-input-multiple-output channel.

33. The computer program product of claim 32, wherein the reports of each period further comprise a channel quality indicator of said channel, and: when executed the code will interpret the indication of the channel quality indicator without a report of a rank indication for said period by instead using the predetermined default rank, and use that interpretation to control a transmission of a subsequent signal to the receiver over the wireless multiple-input-multiple-output channel.

34. A method of feeding back information from a receiver to a transmitter, the method comprising:
receiving signals at the receiver from the transmitter over a wireless multiple-input-multiple-output channel;
based on the received signals, sequentially transmitting a plurality of reporting instances back from the receiver to the transmitter including at least a report indicating a pre-coding matrix;
in the event that a report indicating a rank of the respective pre-coding matrix is not transmitted back from the receiver to the transmitter before transmitting the report indicating a pre-coding matrix, then instead, at the receiver, determining the report indicating the pre-coding matrix using a default rank, and transmitting that report back to the transmitter.

35. A method according to claim 34, comprising: at the transmitter, interpreting the indication of said pre-coding matrix without a report of a rank indication by instead using the default rank, and using that interpretation to control a transmission of a subsequent signal to the receiver over the wireless multiple-input-multiple-output channel.

36. A method according to claim 35, wherein said reporting instances include a report of a channel quality indicator, and the method comprises: at the receiver, determining the report of the channel quality indicator using the default rank, and transmitting that report back to the transmitter.

37. A receiver for receiving signals from a transmitter over a wireless multiple-input-multiple-output channel, the receiver comprising:
feedback means configured, to based on the received signals, sequentially transmitting a plurality of reporting instances back from the receiver to the transmitter including at least a report indicating a pre-coding matrix; and
processing means configured so as, in the event that a report indicating a rank of the respective pre-coding matrix is not transmitted back from the receiver to the transmitter before transmitting the report indicating a pre-coding matrix, to instead to determine the report indicating the pre-coding matrix using a default rank, and transmit that report back to the transmitter.

38. The receiver of claim 37, wherein said reporting instances include a report of a channel quality indicator, and the processing means is configured to determine the report of the channel quality indicator using the default rank, and transmit that report back to the transmitter.

39. A transmitter for transmitting signals to a receiver over a wireless multiple-input-multiple-output channel and receiving a plurality of reporting instances back from the receiver including a report indicating a pre-coding matrix, the transmitter comprising:
processing means configured to interpret the indication of the pre-coding matrix received back from the receiver without a report of a rank indication by instead using a default rank, wherein the transmitter is pre-configured with the default rank and use that interpretation to control a transmission of a subsequent signal to the receiver over the wireless multiple-input-multiple-output channel.

40. The transmitter of claim 39, wherein the reports further include a channel quality indicator of said channel, and: the transmitter's processing means are configured to interpret the indication of the channel quality indicator without a report of a rank indication by instead using the default rank, and use that interpretation to control a transmission of a subsequent signal to the receiver over the wireless multiple-input-multiple-output channel.

41. A computer program product for feeding back information from a receiver to a transmitter, the program comprising code stored on a non-transitory computer readable medium, which when executed on a processor of the receiver will:
receive signals from the transmitter to the receiver over a wireless multiple-input-multiple-output channel;
based on the received signals, sequentially transmit a plurality of reporting instances back from the receiver to the transmitter including at least a report indicating a pre-coding matrix;
in the event that a report indicating a rank of the respective pre-coding matrix is not transmitted back from the receiver to the transmitter before transmitting the report indicating a pre-coding matrix, then instead to determine the report indicating the pre-coding matrix using a default rank, and transmit that report back to the transmitter.

42. The computer program product of claim 41, wherein said reporting instances include a report of a channel quality indicator, and when executed the code will determine the report of the channel quality indicator using the default rank, and transmit that report back to the transmitter.

43. A computer program product for transmitting signals to a receiver over a wireless multiple-input-multiple-output channel and receiving a plurality of reporting instances back from the receiver including a report indicating a pre-coding matrix, the program comprising code stored on a non-transitory computer readable medium, which when executed will:
interpret the indication of the pre-coding matrix received back from the receiver without a report of a rank indication by instead using a default rank, wherein the transmitter is pre-configured with the default rank and use that interpretation to control a transmission of a subsequent signal to the receiver over the wireless multiple-input-multiple-output channel.

44. The computer program product of claim 43, wherein the reports further include a channel quality indicator of said channel, and when executed the code will: interpret the indication of the channel quality indicator without a report of a rank indication by instead using the default rank, and use that interpretation to control a transmission of a subsequent signal to the receiver over the wireless multiple-input-multiple-output channel.

45. A method of feeding back information from a receiver to a transmitter, the method comprising:
receiving signals at the receiver from the transmitter over a wireless multiple-input-multiple-output channel;
based on the received signals, transmitting a plurality of reports back from the receiver to the transmitter in a periodic sequence, each period comprising a plurality of reports at respective time intervals, the reports of each period including a Rank Indicator (RI) report and a Precoding Matrix Indicator (PMI) report, but at least an RI report in one of said periods being replaced with one of an ACK, NACK and Scheduling Request (SR) or missed due to a Discontinuous Reception (DRX) cycle;
at the receiver, determining a PMI report of said period on the basis of a default rank, and transmitting that report back to the transmitter.

46. The method of claim 45, comprising: at the transmitter, interpreting the PMI report of said period without an RI report for said period by instead using the default rank, and using that interpretation to control a transmission of a subsequent signal to the receiver over the wireless multiple-input-multiple-output channel.

47. The method of claim 45, wherein the reports of each period include a CQI report, and the method comprises: at the receiver, determining a CQI report of said period on the basis of the default rank, and transmitting that report to the transmitter.

48. A receiver for receiving signals from the transmitter to the receiver over a wireless multiple-input-multiple-output channel, the receiver comprising:
feedback means configured to, based on the received signals, transmit a plurality of reports back from the receiver to the transmitter in a periodic sequence, each period comprising a plurality of reports at respective time intervals, the reports of each period including a Rank Indicator (RI) report and Precoding Matrix Indicator (PMI) report, but at least the RI report in one of said periods being replaced with one of an ACK, NACK and Scheduling Request (SR) or missed due to a Discontinuous Reception (DRX) cycle;
at the receiver, determining a PMI report of said period on the basis of a default rank, and transmitting that report back to the transmitter.

49. The receiver of claim 48, wherein the reports of each period include a CQI report, and the processing means is configured to: determine a CQI report of said period on the basis of the default rank, and transmitting that report to the transmitter.

50. A transmitter for transmitting signals from the transmitter to the receiver over a wireless multiple-input-multiple-output channel and receiving back a plurality of reports back from the receiver to the transmitter in a periodic sequence, each period comprising a plurality of reports at respective time intervals, the reports of each period including a Rank Indicator (RI) report and Precoding Matrix Indicator (PMI) report, but at least the RI in one of said periods being replaced with one of an ACK, NACK and Scheduling Request (SR) or missed due to a Discontinuous Reception (DRX) cycle, the transmitter comprising:
processing means configured to interpret the PMI report of said period without an RI report for said period by instead using a default rank, wherein the transmitter is pre-configured with the default rank, and use that interpretation to control a transmission of a subsequent signal to the receiver over the wireless multiple-input-multiple-output channel.

51. The transmitter of claim 50, wherein the reports of each period include a CQI report, and the processing means is configured to: interpret the CQI report of said period without an RI report for said period by instead using a default rank, and using that interpretation control a transmission of a subsequent signal to the receiver over the wireless multiple-input-multiple-output channel.

52. A computer program product for feeding back information from a receiver to a transmitter, the program comprising code stored on a non-transitory computer readable medium, which when executed on a processor of the receiver will:
receive signals from the transmitter over a wireless multiple-input-multiple-output channel;
based on the received signals, transmit a plurality of reports back from the receiver to the transmitter in a periodic sequence, each period comprising a plurality of reports at respective time intervals, the reports of each period including a Rank Indicator (RI) report and a Precoding Matrix Indicator (PMI) report, but at least the RI report in one of said periods being replaced with one of an ACK, NACK and Scheduling Request (SR) or missed due to a Discontinuous Reception (DRX) cycle;

at the receiver, determine a PMI report of said period on the basis of a default rank, and transmitting that report back to the transmitter.

53. The computer program product of claim 52, wherein the reports of each period include a CQI report, and when executed the code will: determine a CQI report of said period on the basis of the default rank, and transmit that report to the transmitter.

54. A computer program product for transmitting signals from the transmitter to the receiver over a wireless multiple-input-multiple-output channel and receiving back a plurality of reports back from the receiver to the transmitter in a periodic sequence, each period comprising a plurality of reports at respective time intervals, the reports of each period including a Rank Indicator (RI) report and a Precoding Matrix Indicator (PMI) report, but the RI report in one of said periods being replaced with one of an ACK, NACK and Scheduling Request (SR) or missed due to a Discontinuous Reception (DRX) cycle, the program comprising code stored on a non-transitory computer readable medium, which when executed on a processor of the transmitter will: interpret the PMI report of said period without an RI report for said period by instead using a default rank, wherein the transmitter is pre-configured with the default rank, and use that interpretation to control a transmission of a subsequent signal to the receiver over the wireless multiple-input-multiple-output channel.

55. The computer program product of claim 54, wherein the reports of each period include a CQI report, and when executed the code will: interpret the CQI report of said period without an RI report for said period by instead using a default rank, and using that interpretation control a transmission of a subsequent signal to the receiver over the wireless multiple-input-multiple-output channel.

* * * * *